United States Patent
Bernard et al.

(10) Patent No.: US 7,510,778 B2
(45) Date of Patent: Mar. 31, 2009

(54) PART FOR PROTECTING THE LEADING EDGE OF A BLADE

(75) Inventors: Jacques Bernard, Vaux le Penil (FR); Claude Marcel Mons, Savigny le Temple (FR); Isabelle Peslerbe, Ollainville (FR); Thierry Thomas, Montfermeil (FR)

(73) Assignee: SNECMA, Paris (FR)

( * ) Notice: Subject to any disclaimer, the term of this patent is extended or adjusted under 35 U.S.C. 154(b) by 215 days.

(21) Appl. No.: 11/279,675

(22) Filed: Apr. 13, 2006

(65) Prior Publication Data

US 2006/0275626 A1    Dec. 7, 2006

(30) Foreign Application Priority Data

Apr. 15, 2005  (FR) ................... 05 03780

(51) Int. Cl.
*B32B 15/04*  (2006.01)
*B32B 7/02*  (2006.01)
*B32B 15/20*  (2006.01)
*F01D 5/28*  (2006.01)

(52) U.S. Cl. .............. 428/610; 428/457; 428/654; 428/689; 416/224; 416/241 R

(58) Field of Classification Search .............. None
See application file for complete search history.

(56) References Cited

U.S. PATENT DOCUMENTS

| | | | |
|---|---|---|---|
| 3,762,835 A | 10/1973 | Carlson et al. | |
| 3,981,616 A * | 9/1976 | Stargardter et al. | .......... 416/233 |
| 4,010,530 A | 3/1977 | Delgrosso et al. | |
| 4,627,896 A | 12/1986 | Nazmy et al. | |
| 5,160,822 A * | 11/1992 | Aleshin | .......... 219/121.64 |
| 5,511,603 A | 4/1996 | Brown et al. | |
| 5,620,791 A * | 4/1997 | Dwivedi et al. | .......... 428/323 |

(Continued)

FOREIGN PATENT DOCUMENTS

DE    41 37 839 A1    5/1993

(Continued)

OTHER PUBLICATIONS

JP 2003-064428 English Machine Translation, Tsuto et al, Mar. 2003.*

(Continued)

*Primary Examiner*—Keith D Hendricks
*Assistant Examiner*—Jason L Savage
(74) *Attorney, Agent, or Firm*—Oblon, Spivak, McClelland, Maier & Neustadt, P.C.

(57) ABSTRACT

A protection part comprising at least two layers including an outer layer and an inner layer has its outer layer made of an aluminum alloy that is reinforced with particles of SiC, the SiC particle content in said alloy lying in the range 15% to 40% by weight, while the inner layer is made of an aluminum alloy that is optionally reinforced with SiC particles, the SiC particle content within the layers increasing from the inner layer towards the outer layer. The part is for use in protecting the leading edge of a blade, in particular a blade or vane in a turbomachine, a helicopter blade, or a propeller blade.

6 Claims, 1 Drawing Sheet

U.S. PATENT DOCUMENTS

| | | | |
|---|---|---|---|
| 5,632,600 A * | 5/1997 | Hull | 416/198 A |
| 2003/0009870 A1 | 1/2003 | Boschet et al. | |
| 2006/0127693 A1 * | 6/2006 | Peslerbe et al. | 428/650 |
| 2007/0110562 A1 * | 5/2007 | Mons et al. | 415/110 |
| 2007/0116556 A1 * | 5/2007 | Mons et al. | 415/110 |
| 2007/0134096 A1 * | 6/2007 | Mons et al. | 416/97 R |
| 2007/0253810 A1 * | 11/2007 | Mons et al. | 415/174.5 |

FOREIGN PATENT DOCUMENTS

| | | | |
|---|---|---|---|
| EP | 0 816 637 A2 | | 1/1998 |
| EP | 1 384 539 | * | 1/2004 |
| GB | 2 242 848 A | | 10/1991 |

OTHER PUBLICATIONS

WO 2004-111600 Derwent showing related cases including EP 1 384 539 and US 2006/0127693.*

* cited by examiner

PART FOR PROTECTING THE LEADING EDGE OF A BLADE

The invention relates to a protection part used, for example, for protecting the leading edge of a blade in a turbomachine, a propeller blade, or a helicopter blade.

BACKGROUND OF THE INVENTION

In the field of aviation, and more particularly in the field of aircraft turbojets, reducing the weight of the component parts of the turbojet is a perpetual preoccupation.

Thus, blades have been developed for turbojet fans or stators that are made of an organic-matrix composite material (e.g. based on cyanate-ester, bismaleimide, or epoxy resin), such that the blades are lighter in weight than metal blades.

Nevertheless, the leading edges of such blades need to be protected against erosion and possible impacts by means of a protection part fitted to the leading edge.

Until now, such protection parts have been made of titanium alloy of the TA6V type. That solution is technically viable, since the alloy presents good resistance to erosion and to impacts. Nevertheless, it is found that the weight of such protection parts is excessive.

OBJECTS AND SUMMARY OF THE INVENTION

An object of the invention is to propose protection parts of lighter weight than prior art parts made of titanium alloy, and that are strong enough to perform their protection function.

To achieve this object, the invention provides a protection part presenting an outer protection face and wherein said outer face is made of an aluminum alloy reinforced by particles of SiC, the SiC particle content in said alloy lying in the range 15% to 40% by weight, and advantageously 15% to 30% by weight.

The density of SiC-reinforced aluminum alloys is about 40% less than that of the titanium alloys that are generally used. This results in a significant saving in weight, and makes it possible amongst other things to limit the stresses due to centrifugal forces acting on the hubs of the blade-carrier disk. That makes it possible to design disks that do not need to be so strong and that are therefore lighter in weight, thereby further reducing the weight of the turbojet.

The SiC particles serve to improve the strength of the aluminum. At below 15% SiC, this strength is not sufficient. Above 40% SiC, the alloy is too difficult to form. Advantageously, the SiC content remains below 30% in order to facilitate forming.

In a particular embodiment of the invention, the part comprises at least two layers including an outer layer and an inner layer, the outer layer being made of said reinforced aluminum alloy and the inner layer being made of an aluminum alloy that is optionally reinforced with SiC particles, the content of SiC particles within the layers increasing on going from the inner layer towards the outer layer. Thus, mechanical strength increases going from the inside towards the outside of the part.

Using an aluminum alloy that is reinforced little or not at all for the inner layer makes it easier to secure said layer to the blade. This is particularly true when the blade is made of organic-matrix composite material (as opposed to metal-matrix composite material) and the protection part is bonded thereto by adhesive. In practice, in order to secure the protection part of the invention, it is possible to use the same adhesives and adhesive techniques that are already used for securing protection parts made of TA6V titanium alloy. There is therefore no need to develop adhesives that are specific for the part of the invention.

The protection part of the invention has been developed more particularly for fitting to a blade made of composite material, and in particular an organic-matrix composite material. Nevertheless, it could also be fitted to a blade made of some other type of material.

BRIEF DESCRIPTION OF THE DRAWING

The invention and its advantages can be better understood on reading the following detailed description which refers to the accompanying sheet of figures, in which.

MORE DETAILED DESCRIPTION

Figure 1:
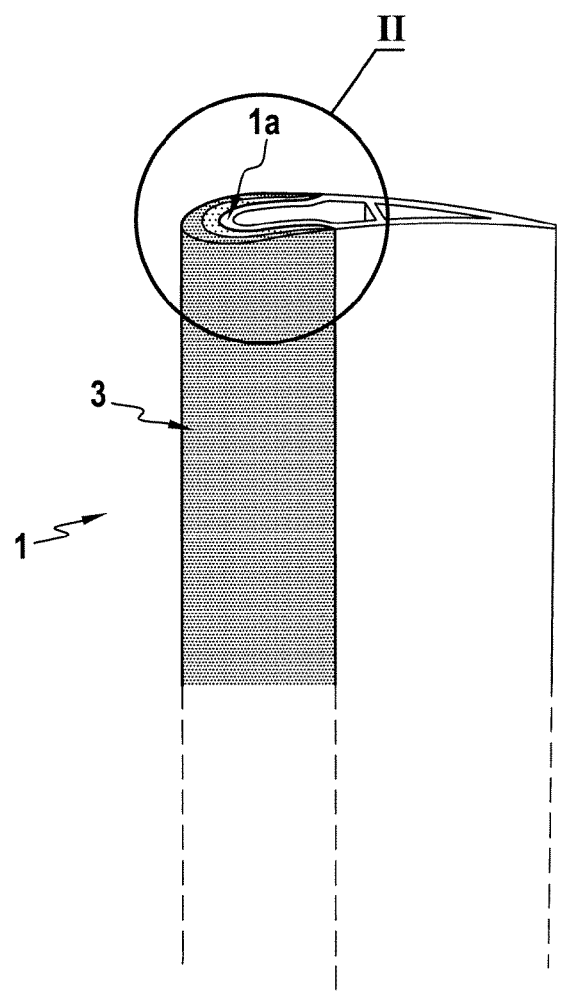
FIG. 1 is a perspective view of a blade showing its cross-section, the blade having a protection part of the invention fitted to its leading edge.
Figure 2:
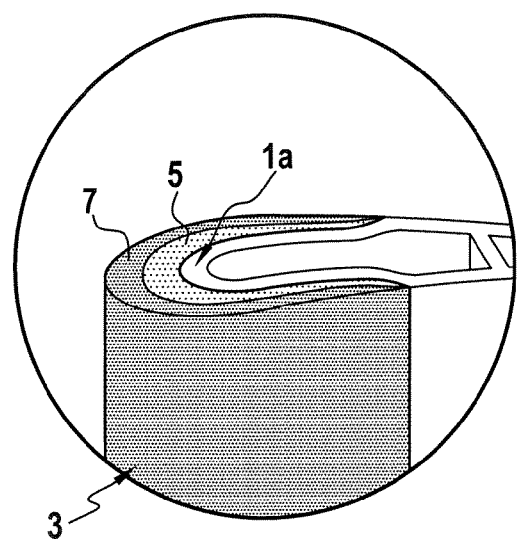
FIG. 2 is a detail view on a larger scale of the cross-section of the FIG. 1 blade.

FIGS. 1 and 2 show the airfoil portion of a turbomachine blade 1. The leading edge 1a of the blade 1 is covered by a protection part 3 of the invention.

The protection part 3 is substantially U-shaped in section, enabling it to be placed astride the leading edge 1a of the blade 1. The part 3 is made up of two layers, an inner layer 5 and an outer layer 7. The outer layer 7 is of aluminum alloy reinforced with particles of SiC, while the inner layer 5 is made of the same aluminum alloy, but is not reinforced with SiC. Preferably, for aviation applications, an aluminum alloy of the 7000 series is selected.

Naturally, the protection part may have more than two layers, with the content of SiC particles in each layer increasing going from the inside towards the outside. Thus, in an embodiment not shown, the protection part is made of four layers C1, C2, C3, and C4 with the SiC content in the inner layer C1 being zero, about 10% by weight in C2, about 20% in C3, and about 30% in the outer layer C4.

In order to assemble the layers of the protection part to one another, various techniques can be used.

Advantageously, use is made of co-extrusion or of roll-bonding, which two techniques work well with aluminum alloys, whether or not they are reinforced with sic.

Co-extrusion consists in causing a bar of non-reinforced aluminum alloy surrounded by a sleeve of SiC-reinforced aluminum alloy to pass through a die (a reduction cone). The compression forces and the heating generated by friction between the two materials at their interface, ensure that the two materials become intimately bonded. This produces a bar with a core of non-reinforced aluminum alloy and a covering of SiC-reinforced aluminum alloy. The bar obtained in this way can subsequently be formed, e.g. by stamping.

Roll-bonding consists in pressing together a plurality of aluminum alloy plates either hot or cold in order to bond them to one another. In order to obtain a protection part 3 as shown in FIG. 1 having two layers 5 and 7, an SiC-reinforced aluminum alloy plate is pressed against a plate of non-reinforced aluminum alloy. As a general rule, two cylindrical rollers are used with the plates being cause to pass between them. Thereafter, the final plate is formed (to take up a U-shape), e.g. by forging or by stamping.

Once the protection part 3 has been formed, it is bonded to the leading edge 1a of the blade 1.

In order to make said sleeve or said plate of SiC-reinforced aluminum alloy, use is made of conventional powder-metallurgy techniques, consisting in mixing an aluminum alloy powder with an SiC powder, and in densifying the powder mixture, e.g. by sintering, so as to give it the desired shape.

The blade 1 is the airfoil portion of a blade or a vane in a turbomachine. More particularly, it may form part of a fan blade or of a stator vane for a turbojet. The airfoil portion of a blade is the portion surmounting the blade root, while the blade root is the portion used for securing the blade to the remainder of the turbomachine.

When the blade 1 is a fan blade, it can be made by injecting resin on a fiber preform. The fiber preform and the resin then respectively constitute the fiber reinforcement and the matrix of the resulting composite material. The fiber preform may be obtained in particular by weaving and various known methods of injecting resin onto a fiber preform can be used, including the resin transfer molding (RTM) method.

The blade 1 could also be a propeller blade or a helicopter blade.

What is claimed is:

1. An assembly comprising:
    a blade of a turbomachine, a helicopter, or a propeller, said blade having a leading edge, and
    a protection part for protecting a leading edge of a blade, said protection part being configured to fit onto the leading edge of said blade, said protection part comprising an outer protection face made of an aluminum alloy reinforced by particles of SiC, an SiC particle content in said aluminum alloy lying in a range 15% to 40% by weight, said protection part comprising at least two layers, including an outer layer and an inner layer, the outer layer being made of said reinforced aluminum alloy and the inner layer being made of an aluminum alloy, a content of SiC particles in the outer and inner layers increasing from the inner layer to the outer layer,
    wherein said protection part is fitted onto the leading edge in order to protect said leading edge,
    wherein the blade is made of an organic-matrix composite material.

2. An assembly according to claim 1, wherein the content of SiC particles in said alloy lies in the range 15% to 30% by weight.

3. An assembly according to claim 1, wherein the inner layer is reinforced with SiC particles.

4. An assembly according to claim 1, wherein said at least two layers are assembled together by co-extrusion or by roll-bonding.

5. An assembly according to claim 1, comprising a section that is substantially U-shaped.

6. An assembly according to claim 1, wherein said protection part is bonded on the leading edge by an adhesive.

* * * * *